United States Patent
Wei et al.

(10) Patent No.: US 7,170,876 B2
(45) Date of Patent: Jan. 30, 2007

(54) OUTER-LOOP SCHEDULING DESIGN FOR COMMUNICATION SYSTEMS WITH CHANNEL QUALITY FEEDBACK MECHANISMS

(75) Inventors: Yongbin Wei, San Diego, CA (US); Jack M. Holtzman, San Diego, CA (US); Gang Bao, San Diego, CA (US); Sandip Sarkar, San Diego, CA (US); David Puig-Oses, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 927 days.

(21) Appl. No.: 10/136,906

(22) Filed: Apr. 30, 2002

(65) Prior Publication Data

US 2003/0204615 A1 Oct. 30, 2003

(51) Int. Cl.
*H04L 1/12* (2006.01)
(52) U.S. Cl. ..................... 370/335; 370/342
(58) Field of Classification Search ........ 370/342–343, 370/229–236, 328, 329, 335
See application file for complete search history.

(56) References Cited

U.S. PATENT DOCUMENTS

| 4,901,307 A | 2/1990 | Gilhousen et al. |
|---|---|---|
| 5,103,459 A | 4/1992 | Gilhousen et al. |
| 5,465,398 A | 11/1995 | Flammer |
| 6,175,744 B1 * | 1/2001 | Esmailzadeh et al. ...... 455/522 |
| 6,393,012 B1 * | 5/2002 | Pankaj ....................... 370/342 |
| 6,859,446 B1 * | 2/2005 | Gopalakrishnan et al. .. 370/335 |
| 2003/0072297 A1 | 4/2003 | Oses et al. |

FOREIGN PATENT DOCUMENTS

| EP | 0 709 973 A1 | 5/1996 |
|---|---|---|
| WO | 01/73972 A1 | 10/2003 |

* cited by examiner

*Primary Examiner*—Hassan Kizou
*Assistant Examiner*—Salman Ahmed
(74) *Attorney, Agent, or Firm*—Philip R. Wadsworth; Thien T. Nguyen; Roberta A. Young

(57) ABSTRACT

Methods and apparatus are presented for dynamically adjusting parameters of an outer-loop algorithm, which is used to determine the feasibility of a transmission format. The parameters of the outer-loop algorithm are adjusted according to channel conditions. In one embodiment, an erasure-based approach is used to determine whether to incrementally increase or incrementally decrease a margin parameter in the outer-loop algorithm. Once one margin parameter is altered, other margin parameters can be adjusted accordingly.

25 Claims, 5 Drawing Sheets

OUTER-LOOP SCHEDULING DESIGN FOR COMMUNICATION SYSTEMS WITH CHANNEL QUALITY FEEDBACK MECHANISMS

BACKGROUND

1. Field

The present invention relates generally to communications, and more specifically, to improving the interpretation of channel quality and reception of acknowledgement feedback information from a receiver, which can be used to schedule transmissions, control transmission rates, and to maintain quality of service over a wireless communication system.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses systems using either cellular or personal communication services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ *Generation Partnership Project* "3GPP", Document Nos. 3G TS 25.211, 3G TS 25.212, 3G TS 25.213, and 3G TS 25.214.

The telecommunication standards cited above are examples of only some of the various communication systems that can be implemented. Some of these various communication systems are configured so that remote stations can transmit information regarding the quality of the transmission medium and the acknowledgement of a previous transmission to the remote stations to a serving base station. This information can then be used by the serving base station to optimize the power levels, the transmission formats, and the timing of forward link transmissions, and further, to control the power levels of reverse link transmissions.

As used herein, "forward link" refers to the transmissions directed from a base station to a remote station and "reverse link" refers to transmissions directed from a remote station to a base station. The forward link and the reverse link are uncorrelated, meaning that observations of one do not facilitate the prediction of the other. However, for stationary and slow-moving remote stations, the characteristics of the forward link transmission path will be observed to be similar to the characteristics of the reverse link transmission path in a statistical sense.

Channel conditions of received forward link transmissions, such as the carrier-to-interference (C/I) ratio, can be observed by a remote station, which reports such information to a serving base station. The base station then uses this knowledge to schedule transmissions to the remote station selectively. For example, if the remote station reports the presence of a deep fade, the base station would refrain from scheduling a transmission until the fading condition passes. Alternatively, the base station may decide to schedule a transmission, but at a high transmission power level in order to compensate for the fading condition. Alternatively, the base station may decide to alter the data rate at which transmissions are sent, by transmitting data in formats that can carry more information bits. For example, if the channel conditions are bad, data can be transmitted in a transmission format with many redundancies so that corrupted symbols are more likely to be recoverable. Hence, the data throughput is lower than if a transmission format without redundancies were used instead.

The base station can also use this channel information to balance the power levels of all the remote stations within operating range, so that reverse link transmissions arrive at the same power level. In CDMA-based systems, channelization between remote stations is produced by the use of pseudorandom codes, which allows a system to overlay multiple signals on the same frequency. Hence, reverse link power control is an essential operation of CDMA-based systems because excess transmission power emitted from one remote station could "drown out" transmissions of its neighbors.

In communication systems that use feedback mechanisms to determine the quality of the transmission media, channel conditions are continuously conveyed on the reverse link. A remote station monitors the channel quality of the forward link and feeds it back to the base station via a feedback channel. In a cdma2000 system, the feedback channel is referred to as the Reverse Channel Quality Indicator Channel (R-CQICH). The transmission of a channel quality value on the R-CQICH is carried out in every slot of the R-CQICH. For slow moving or stationary remote stations, the transmission of a channel quality value on each slot allows the base station to accurately predict the state of the forward link. Therefore, the base station can accurately determine the transmit format and timing of transmissions to the remote station. However, when a remote station is traveling at a high velocity, the high velocity causes fast fading conditions that the base station cannot accurately estimate using outdated channel quality values. Hence, in order to maintain a designated transmission success rate, some mechanism is needed to allow the base station to select the transmission rate and timing based on adjusted channel quality feedback values, wherein the adjusted channel quality feedback values accommodate the outdated conditions.

SUMMARY

Methods and apparatus are presented herein to address the problems stated above. At a base station, a scheduling element is configured to implement an improved outer-loop design that determines whether a transmission format can be supported by the resources available at the base station. In one aspect, an apparatus is presented for transmitting a packet in a transmission format, the apparatus comprising: a receiving subsystem for receiving channel quality information from a remote station; a scheduling element for inserting a data payload into a packet for transmission, wherein the scheduling element is configured to use a outer-loop algorithm to determine the feasibility of a transmission format for the packet and to alter the parameters of the outer-loop algorithm in accordance with the channel quality information; and a transmission subsystem for transmitting the packet to the remote station.

In another aspect, a method is presented for adapting a margin parameter of an outer-loop algorithm used to schedule packet transmissions, the method comprising: receiving channel quality information from a remote station; determining a channel variation rate from the channel quality information; determining whether to increase or decrease the margin parameter by a margin increment, wherein the margin increment is based on the channel variation rate; comparing the margin parameter to a second margin parameter; and altering the second margin parameter according to a set of selection rules.

In another aspect an apparatus for formatting a packet into a transmission format is presented, comprising: a memory element; and a processing element configured to execute a set of instructions on the memory element, the set of instructions for: determining a fading curve representative of a transmission channel on which the packet is to be sent to a remote station; determining a margin offset to the fading curve based on a feedback message from the remote station; and determining whether a transmission format incorporating the margin offset is feasible for formatting the packet.

DETAILED DESCRIPTION

Figure 1:
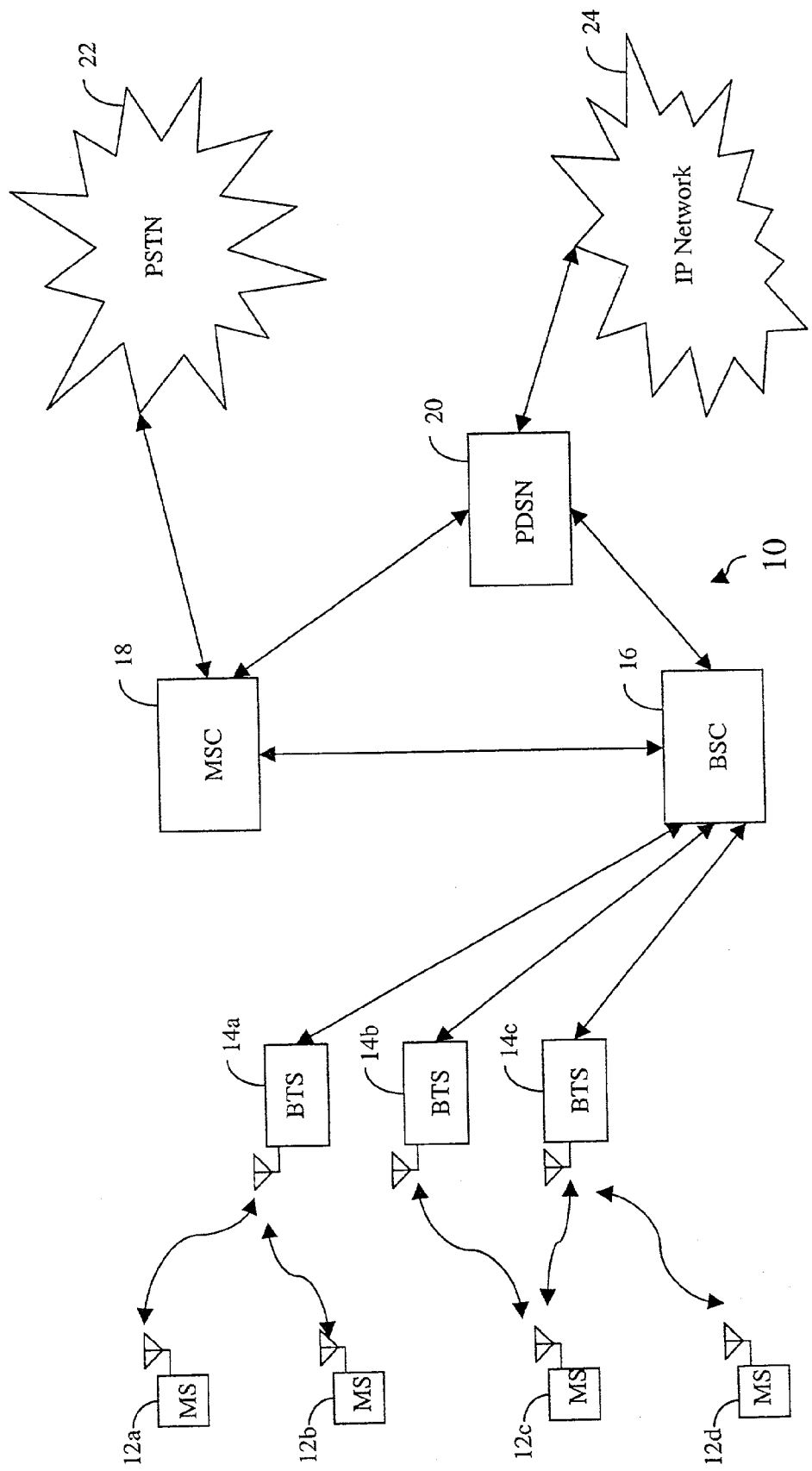
FIG. 1 is a diagram of a wireless communication network.

As illustrated in FIG. 1, a wireless communication network 10 may generally includes a plurality of mobile stations (also called remote stations or subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be more or less number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 can be coupled directly to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used hereafter. Such use is not intended to limit the implementation of the embodiments herein to cdma2000 systems. Implementations in other systems, such as, e.g., WCDMA, can be accomplished without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and/or code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration.

A scheduling element in the base station is configured to control the transmission format of each packet, the rate of each packet, and the slot times over which each packet is to be transmitted to a remote station. The terminology "packet" is used to describe system traffic. Packets can be divided into subpackets, which occupy slots of a transmission channel. "Slot" is used to describe a time duration of a message frame. The use of such terminology is common in cdma2000 systems, but the use of such terminology is not meant to limit the implementation of the embodiments herein to cdma2000 systems. Implementation in other systems, such as, e.g. WCDMA, can be accomplished without affecting the scope of the embodiments described herein.

Scheduling is a vital component in attaining high data throughput in a packet-based system. In the cdma2000 system, the scheduling element (which is also referred to as a "scheduler" herein) controls the packing of payload into redundant and repetitious subpackets that can be soft-combined at a receiver, so that if a received subpacket is corrupted, it can be combined with another corrupted subpacket to determine the data payload within an acceptable frame error rate (FER). For example, if a remote station requests the transmission of data at 76.8 kbps, but the base station knows that this transmission rate is not possible at the requested time due to the condition of channel, the scheduler in the base station can control the packaging of the data payload into multiple subpackets. The remote station will receive multiple corrupted subpackets, but will still be likely to recover the data payload by soft-combining the bits of the subpackets. Hence, the actual transmission rate of the bits can be different from the data throughput rate.

The scheduling element in the base station uses an open-loop algorithm to adjust the data rate and scheduling of forward link transmissions. The open-loop algorithm adjusts transmissions in accordance with the varying channel conditions typically found in a wireless environment. In general, a remote station measures the quality of the forward link channel and transmits such information to the base station. The base station uses the received channel conditions to predict the most efficient transmission format, rate, power level and timing of the next packet transmission. In the cdma2000 system, the remote stations can use a channel quality feedback channel (CQICH) to convey channel quality measurements of the best serving sector to the base station. The channel quality may be measured in terms of a carrier-in-interference (C/I) ratio and is based upon received forward link signals. The C/I value is mapped onto a five-bit channel quality indicator (CQI) symbol, wherein the fifth bit is reserved. Hence, the C/I value can have one of sixteen quantization values. The remote station transmits the C/I values continuously, so that the base station is aware of the channel conditions if ever any packets need to be transmitted on the forward link to that remote station.

Due to latency from propagation and processing delays, the base station is scheduling transmissions using outdated channel information. If the typical propagation delay is 2.5 ms in duration, which corresponds to a 2-slot delay in systems with 1.25 ms slots, then the base station may be reacting to a situation that no longer exists, or may fail to react in a timely manner to a new situation.

Due to different channel conditions and different quality of service requirements, the scheduling algorithm in a base station also needs to adjust the decision rules in determining transmission format, transmission power, transmission duration, and transmission timing adaptively, based on the reception quality that a remote station has experienced.

The reception quality of a previously scheduled transmission from a serving base station to a remote station can be observed by the remote station, which reports such acknowledgement information to the serving base station. The base station then uses this knowledge to adjust the transmissions to the remote station. For example, the base station can change the aggressiveness in selecting the transmission format for the transmissions intended to the remote station adaptively based on the acknowledgement feedback. If the remote station keeps reporting failures of previous transmissions, the base station can take this failure information into account in determining subsequent transmission formats and transmission power. For example, data can be transmitted in a transmission format with more redundancies so that corrupted symbols are more likely to be recoverable. Hence, the data throughput is lower than if a transmission format without redundancies were used. Alternatively, the base station may decide to schedule a transmission, but at a high transmission power level in order to avoid more failures.

A scheduling element in a base station can also be configured to interpret channel information received on the CQI channel and other feedback channels, such as the packet data acknowledgement sent on the Reverse Acknowledgement Channel (R-ACKCH). The past channel information is used by the scheduling element to make present transmission decisions that will account for a projected state of the channel. The scheduling element can comprise a processing element coupled to a memory element, and is communicatively coupled to the receiving subsystem and the transmission subsystem of the base station.

Figure 2:
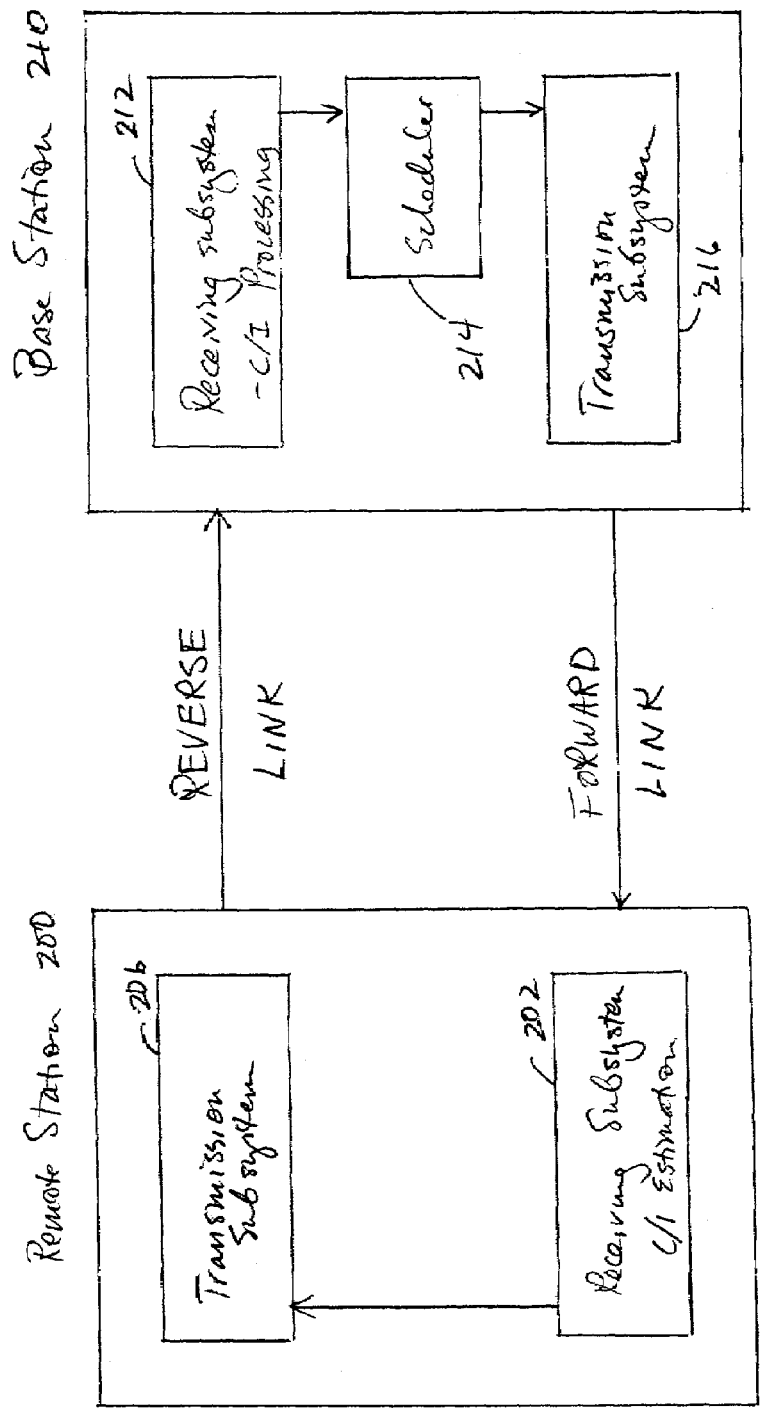
FIG. 2 is a block diagram of some of the functional components of a remote station in communication with a base station.

FIG. 2 is a block diagram of some of the functional components of a base station with a scheduling element. A remote station 200 transmits on the reverse link to a base station 210. At a receiving subsystem 212, the received transmissions are de-spread, demodulated and decoded. A scheduler 214 receives a decoded C/I value and orchestrates the appropriate transmission formats, power levels, and data rates of transmissions from the transmission subsystem 216 on the forward link.

At the remote station 200, a receiving subsystem 202 receives the forward link transmission and determines the forward link channel characteristics. A transmission subsystem 206 transmits such forward link channel characteristics to the base station 210.

In the embodiments described herein, the scheduling element 214 can be programmed to interpret the channel information received on the CQI channel. In one embodiment, the base station can determine the energy levels of the symbols received on the CQI channel, compare the energy levels to a predetermined threshold amount, and then determine that the remote station should be transmitting the C/I values on the CQI channel in a reduced rate mode. The energy levels can be determined in accordance with a number of methods. One quick, computationally light method is the examination of the CQI bits that have been sent on the CQI channel. Knowledge of the cumulative sum of the CQI bits can be used by the base station (or the remote station) to determine the average power of the received signals. In another method, the CQI decoder in the base station can be configured to determine that the received bits do not clearly correspond to a valid codeword hypothesis, which indicates the potential presence of errors, and to report the potential for errors (or the erasures resulting from said errors) to the scheduler.

A general observation is that a remote station traveling at high velocity will experience unfavorable channel conditions. Hence, in one embodiment, a processing element and a memory element can be configured to operate with other components of the remote station to determine the velocity of the remote station, and then selectively implement the reduced rate mode in accordance with the velocity.

In another aspect of the embodiment, the velocity of the remote station can be determined through Doppler frequency estimation, which is proportional to the velocity of the remote station. Doppler estimation can also be performed at either the remote station or the base station. Doppler frequency can be estimated by looking at the received signal strength at the remote station, or it can be estimated at the base station by looking at the channel quality feedback from the remote station.

The embodiments described above serve the practical purpose of allowing the base station to more closely model the event of a fast fade, which can occur when a remote station is traveling at high velocities. "Fading" refers a condition that is also known as multipath interference, which occurs when multiple copies of the same signal arrive at the receiver in a destructive manner. Substantial multipath interference can occur to produce flat fading of the entire frequency bandwidth. If the remote station is travelling in a rapidly changing environment, deep fades could occur at scheduled transmission times. When such a circumstance occurs, the base station requires channel information that allows it to reschedule transmissions quickly and accurately.

In one embodiment, the base station uses the channel feedback information from the remote station to determine the channel variation rate (CVR) of the remote station. The CVR is a qualitative value that may be measured in any units for determining how fast the channel varies. The variation rate can be measured in units of Hertz/sec when Doppler estimation is used to determine the velocity of the remote station, or the variation rate can be measured in relation to an arbitrary reference point, or the variation rate can be a classification, such as, e.g., very slow, slow, fast, or very fast. Any units measuring the variation rate can be used without affecting the scope of the embodiments described herein.

Figure 3:
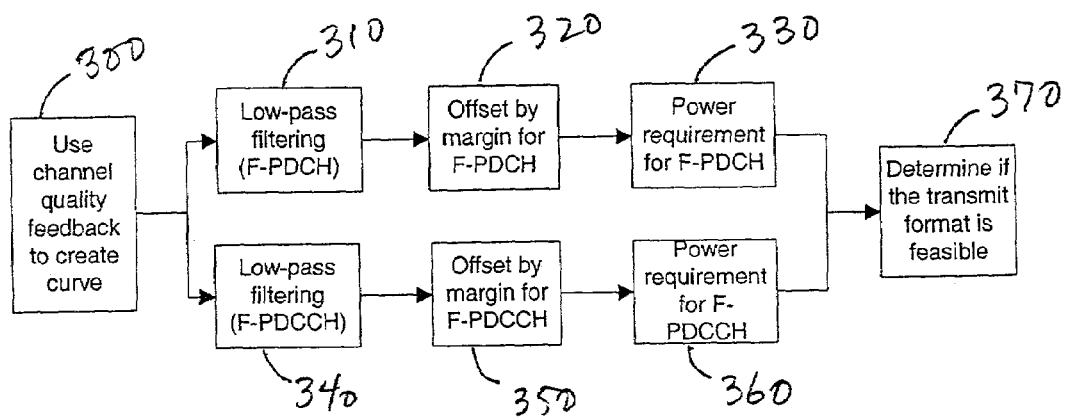
FIG. 3 is a block diagram of an improved outer-loop design.

Once the CVR and the C/I values are determined so that a base station can reconstruct the fading curve, the base station can follow the procedure outlined in the block diagram of FIG. 3 to determine whether a transmit format can be supported by the available base station resources. In one embodiment, the remote station determines the CVR and transmits this channel information to the base station. In another embodiment, the base station estimates the CVR using the C/I values received on the CQI channel.

At block 300, infrastructure elements in the base station reconstruct a fading curve using the channel quality information C/I, and obtain the CVR from the curve. At block 310, the reconstructed fading curve is passed through a low-pass filter to filter out the high frequency components that cannot be predicted due to feedback latency. If the reconstructed fading curve or the CVR indicates a slow fade, then the reconstructed fading curve need not pass through the low-pass filter. At block 320, the values of the reconstructed fading curve are offset by a margin to compensate for the time delay. At block 330, the power requirements for the F-PDCH are evaluated.

In parallel with the feasibility determination on the F-PDCH, a feasibility determination of transmit formats can be performed on the Forward Packet Data Control Channel (F-PDCCH). At block 340, the reconstructed fading curve is passed through a low-pass filter to filter out the high-frequency component that cannot be predicted due to feedback latency. If the CVR indicates a slow fade, then the reconstructed fading curve need not pass through the low-pass filter. At block 350, the values of the reconstructed fading curve are offset by a margin to compensate for the time delay. At block 360, the power requirements for the F-PDCCH are evaluated. At block 370, the infrastructure elements, such as the scheduling element, determines if a given transmit format is feasible on the F-PDCCH with the given power requirements. At block 340, the infrastructure elements, such as the scheduling element, determines if a given transmit format is feasible on the F-PDCH and the F-PDCCH with the given power requirements.

FIG. 3 describes a general outer loop procedure for determining whether a transmission format is appropriate for forward link packets on the F-PDCH and the F-PDCCH. Within the general outer loop procedure, certain parameters can be adjusted to optimize the selection of appropriate transmission formats. Table 1 provides examples of sets of parameters related to rate determination and transmission formats.

TABLE 1

| Channel Model | F-PDCH Offset Margin (dB) | Filter Length for F-PDCH (seconds) | F-PDCCH Margin (dB): 1-slot | F-PDCCH Margin (dB): 2-slot | F-PDCCH Margin (dB): 4-slot | Filter Length for PDCCH (seconds) |
|---|---|---|---|---|---|---|
| A | 0 | 0 | 2 | 1 | 1 | 0 |
| B | 0 | 0 | 3 | 3 | 3 | 0 |
| C | 0 | 0 | 11 | 8 | 8 | 0.1 |
| D | 0 | 0.1 | 16 | 9 | 7 | 0.1 |
| E | 0 | 0 | 1 | 1 | 1 | 0 |

In Table 1, the Channel Model may correspond to channel conditions such as velocity. For example, Channel Model A may correspond to the velocity of the remote station relative to the base station at 3 km/hr; B may correspond to the velocity of 10 km/hr; C may correspond to the velocity of 30 km/hr; D may correspond to the velocity of 120 km/hr; and E may correspond to a static situation. The Offset Margin corresponds to the adjustment of the C/I value at the base station or the remote station to compensate for time delay. The Filter Length corresponds to the time constant of the low-pass filter. (In the example of Table 1, the low-pass filter is not implemented upon the fading curve for low velocities.)

The parameters in Table 1 are determined based upon the assumption that the base station has a perfect knowledge of the CVR. In reality, both the CVR and the parameters need to be estimated. The embodiments described herein adaptively determine values for the above parameters.

In one embodiment, a remote station estimates the CVR based on the common pilot signal. The remote station may estimate the CVR by using a method that examines properties of the pilot signal, such as, e.g., the level crossing rate, auto-correlation, and short-term variances of the pilot signal. The remote station then sends the CVR to a serving base station. The base station then uses a predetermined mapping or table, such as one similar to Table 1, to determine the margins and time constants for filtering based on the CVR feedback. In an alternate embodiment, the remote station estimates the CVR and determines the margins and time constants accordingly, which are then transmitted to the base station.

In one embodiment, a serving base station estimates the CVR based on received channel feedback from a remote station. The base station may estimate the CVR by using re-constructing the channel with the channel feedback information, and by then examining at least one of the properties of the re-constructed signal, such as, e.g., the level crossing rate, auto-correlation, and short-term variances of the re-constructed signal. The base station then uses a predetermined mapping or table, such as one similar to Table 1, to determine the margins and time constants for filtering based on the CVR feedback.

In one embodiment, an erasure-based approach is used to dynamically determine the margin parameters. The time constant parameters of the low-pass filter can be determined using the C/I values. In a communication system where transmission packets are sent as subpackets over slots, such as a cdma2000 communication system, the failure to decode a transmitted packet is deemed a packet erasure. In this embodiment, if there is a packet erasure, as indicated by a negative acknowledgment (NAK) from a remote station after the final subpacket of a packet is transmitted, a base station would increase the margin parameter. If there were no erasure, then the base station would decrease the margin parameter. Since the margin is the amount of adjustment to be subtracted from a received channel feedback value, such as C/I values, a large margin increase causes the scheduler to schedule transmissions in a more conservative manner, since the large margin increase causes the reconstruction of a more unfavorable channel model.

In one embodiment, the increase and decrease step-size amounts of the margins are constant, but the step-size amount of the increase step-size is not equal to the decrease step-size. In another embodiment, the increase and decrease step-size amounts of the margins are not constant, but adaptive based on the recent history of increases and decreases to the margin. In another embodiment, the increase and decrease step-size amounts of the margins are based on an exponentially decreasing curve.

In one embodiment, the size of the incremental decreases can be chosen as a function of the target packet error rate. For example, if the packet error rate is $10^{-2}$, the incremental decrease can be determined using the following formula:

$$\text{Step}_{decrease} = \text{Step}_{increase}/[1/(\text{packet error rate})-1],$$

so that the step size of the incremental decrease would be equal to ($\text{Step}_{increase}/99$) dB. In one embodiment, the size of the incremental decreases can be chosen as a function of the target packet error rate and the numbers of consecutive incremental decreases that has just occurred. For example, the decrease step-size can be set to some predetermined value for the first decrease after an increase occurs. For the following consecutive decrease, the decrease step-size can be adjusted gradually to smaller predetermined values.

Figure 4:
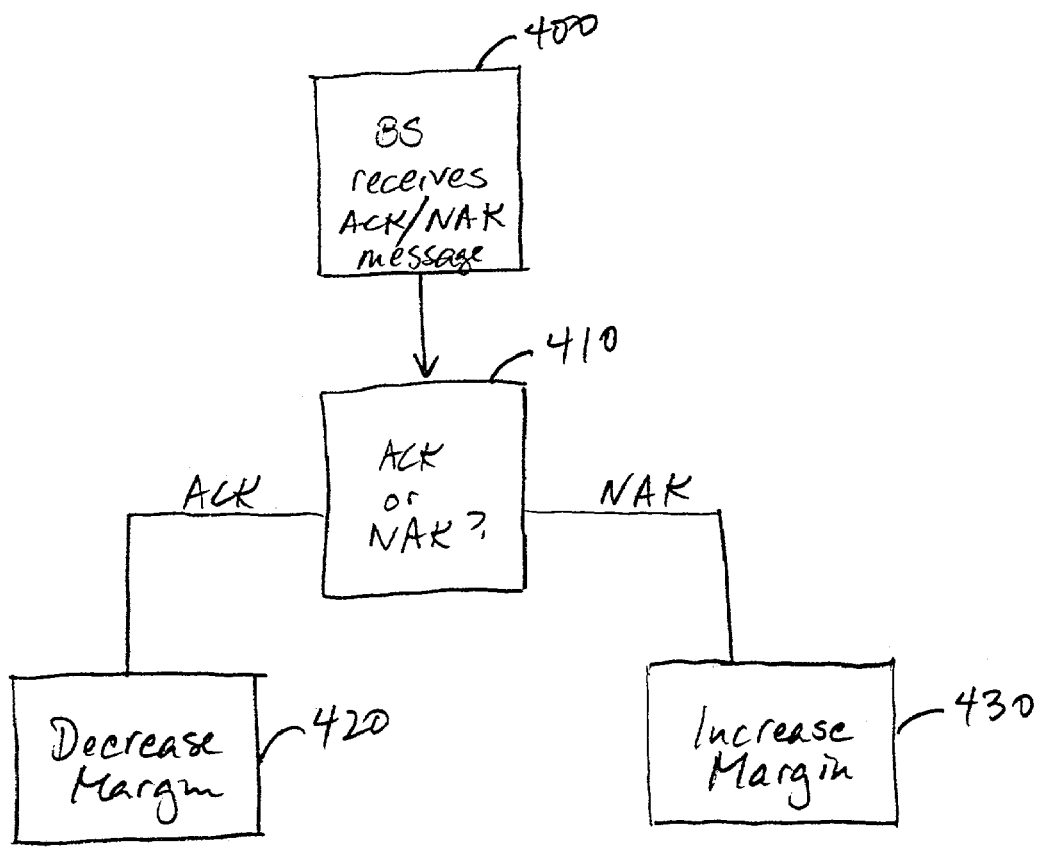
FIG. 4 is a flowchart illustrating an erasure-based method for determining a parameter used by the improved outer-loop design.

FIG. 4 is a flowchart illustrating one example of the erasure-based approach described above. The method steps can be performed by a processor and a memory element, or any other elements that can perform the method steps. At step 400, a base station receives a type of acknowledgment message from a remote station. At step 410, the base station determines whether the message is a positive acknowledgment or a negative acknowledgment. If the message is a positive acknowledgment, the program flow proceeds to step 420. If the message is a negative acknowledgment, the program flow proceeds to step 430.

At step 420, the base station decreases the margin parameter of the outer-loop scheduling algorithm by an incremental amount in accordance to a variably changing step size.

At step 430, the base station increases the margin parameter of the outer-loop scheduling algorithm by an incremental amount, such as 1 dB.

In a cdma2000 system, the forward packet data channel (F-PDCH) carries packets using up to 4 subpackets over a variable number of slots. The F-PDCH is usually accompanied by a control channel, such as the Forward Packet Data Control Channel (F-PDCCH). The F-PDCCH carries a message over one subpacket, which can occupy 1, 2, or 4 slots.

When determining the adjustment to the margin for the F-PDCCH, the packet erasure rate is not examined. Instead, the F-PDCCH control message erasure rate is examined. Similar to the embodiment described above for packet erasures, an embodiment for determining margin parameters for the F-PDCCH uses a F-PDCCH control message erasure. If there is a control message erasure, as indicated by an erasure on the Reverse Acknowledgement Channel, a base station would increase the margin parameter. If there were no erasure, then the base station would decrease the margin parameter. Choosing the step size of an incremental increase or an incremental decrease in regards to the F-PDCCH may be the same as described above for the F-PDCH or follow the same principle.

Alternatively, in another embodiment, the margin parameters for the F-PDCCH are based on the determination of the margin parameters for the F-PDCH in addition to estimated incremental values. Hence, the F-PDCCH margins would be the sum of the F-PDCH margins and an estimated margin amount, wherein the estimated margin amount is reliant upon the acknowledgments and negative acknowledgments of individual subpackets.

In one embodiment, different slot lengths entail the use of different margins for the F-PDCCH. These different margins will change dynamically with the use of subpacket NAK/ACK information or control message erasure information. Certain rules can be imposed to increase the effectiveness of the embodiments described above.

First, if the margin of 4-slot F-PDCCH transmissions is increased and the margins for the 1-slot and 2-slot F-PDCCH transmissions are lower than that of the 4-slot F-SPCCH as a result, then the margins of the 1-slot and 2-slot F-PDCCH transmissions are set to the same value as the margin of the 4-slot F-PDCCH transmissions.

Second, if the margin of 2-slot F-PDCCH transmissions is increased and the margin of a 1-slot F-PDCCH subpacket is lower than that of the 2-slot F-PDCCH transmissions as a result, the margin of the 1-slot F-PDCCH transmissions is set to the same value as the margin of the 2-slot F-PDCCH transmissions.

Third, if the margin of the 1-slot F-PDCCH transmissions is decreased and the margins for 2-slot and 4-slot F-PDCCH transmissions are higher than that of the 1-slot F-PDCCH transmissions as a result, then the margins of the 2-slot and 4-slot F-PDCCH transmissions are set to the same value as the margin of the 1-slot F-PDCCH transmissions.

Fourth, if the margin of the 2-slot F-PDCCH transmissions is decreased and the margin for the 4-slot F-PDCCH subpacket is higher than that of the 2-slot F-PDCCH transmissions as a result, then the margin of the 4-slot F-PDCCH transmissions is set to the same value as the margin of the 2-slot F-PDCCH transmissions.

Figure 5:
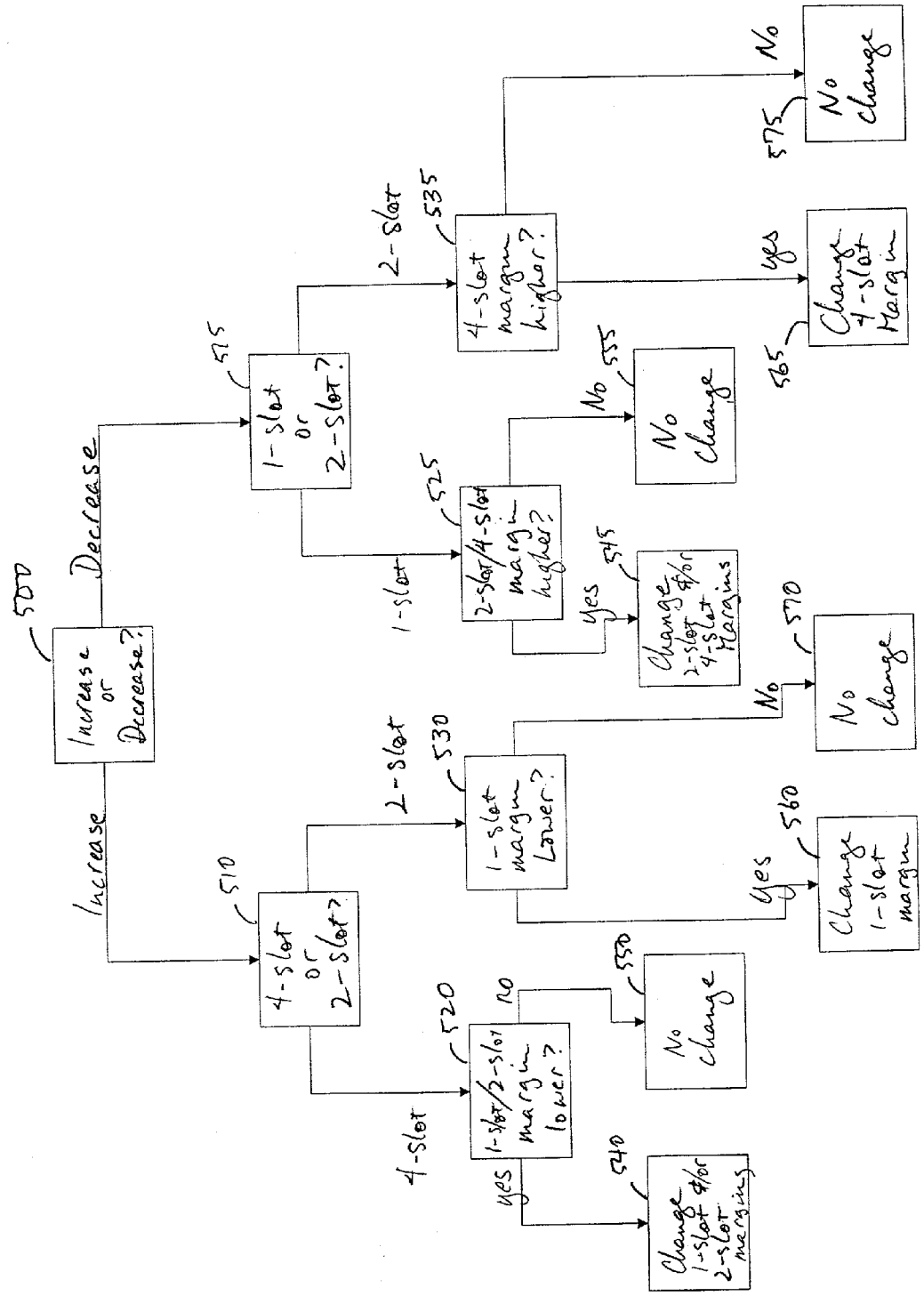
FIG. 5 is a flowchart illustrating decisions for altering margin values.

FIG. 5 is a flowchart illustrating a possible program flow using the rules states above, which can be implemented by a scheduling element to determine whether to adjust the margin parameters of the general outer-loop design of FIG. 3. It should be readily apparent to one of skill in the art that the method steps described herein can be altered without affecting the scope of the embodiments above.

At step 500, a determination is made as to whether an increase or decrease in margin size has been made. If an increase was made, the program flow proceeds to step 510. If a decrease was made, the program proceeds to step 515.

At step 510, a determination is made as to whether the increase was for a 4-slot F-PDCCH transmission or a 2-slot F-PDCCH transmission. If the increase is for a 4-slot F-PDCCH transmission, then the program flow proceeds to step 520. If the increase is for a 2-slot F-PDCCH transmission, then the program flow proceeds to step 530.

At step 520, a determination is made as to whether the margins of the 1-slot F-PDCCH transmission and/or the 2-slot F-PDCCH transmission are lower then the new increased margin for the 4-slot F-PDCCH transmission. If the margins of the 1-slot F-PDCCH transmission and/or the 2-slot F-PDCCH transmission are lower, then at step 540, the margins of the 1-slot F-PDCCH transmission and/or the 2-slot F-PDCCH transmission are reset to the new margin value of the 4-slot F-PDCCH transmission. If the margins of the 1-slot F-PDCCH transmission and the 2-slot F-PDCCH transmission are not lower, then at step 550, the margins of the 1-slot F-PDCCH transmission and the 2-slot F-PDCCH transmission are kept unchanged.

At step 530, a determination is made as to whether the margin of the 1-slot F-PDCCH transmission is lower than the new margin of the 2-slot F-PDCCH transmission. If the margin of the 1-slot F-PDCCH transmission is lower, then at step 560, the margin of the 1-slot F-PDCCH transmission is reset to the new margin value of the 2-slot F-PDCCH transmission. If the margin of the 1-slot F-PDCCH transmission is not lower, then the margin of the 1-slot F-PDCCH transmission is kept unchanged.

At step 515, a determination is made as to whether the decrease was for a 1-slot F-PDCCH transmission or a 2-slot F-PDCCH transmission. If the decrease is for a 1-slot F-PDCCH transmission, then the program flow proceeds to step 525. If the decrease is for a 2-slot F-PDCCH transmission, then the program flow proceeds to step 535.

At step 525, a determination is made as to whether the margins of the 2-slot F-PDCCH transmission and the 4-slot F-PDCCH transmission are higher then the new decreased margin for the 1-slot F-PDCCH transmission. If the margins of the 2-slot F-PDCCH transmission and the 4-slot F-PDCCH transmission are higher, then at step 545, the margins of the 2-slot F-PDCCH transmission and the 4-slot F-PDCCH transmission are reset to the new margin value of the 1-slot F-PDCCH transmission. If the margins of the 2-slot F-PDCCH transmission and the 4-slot F-PDCCH transmission are not higher, then at step 555, the margins of the 2-slot F-PDCCH transmission and the 4-slot F-PDCCH transmission are kept unchanged.

At step 535, a determination is made as to whether the margin of the 4-slot F-PDCCH transmission is higher than the new margin of the 2-slot F-PDCCH transmission. If the margin of the 4-slot F-PDCCH transmission is higher, then at step 565, the margin of the 4-slot F-PDCCH transmission is reset to the new margin value of the 2-slot F-PDCCH transmission. If the margin of the 4-slot F-PDCCH transmission is not higher, then the margin of the 4-slot F-PD-CCH transmission is kept unchanged.

It is envisioned that the embodiments describing the predetermined mapping methodology may be combined with the embodiments describing the erasure-based approach to determining the margin parameters. For example, the margin parameters can be reset periodically in accordance to the predetermined mapping methodology. Between the periodic resets, the margin parameters can be updated using the erasure-based approach.

In regards to some of the operational requirements of remote stations within the range of a base station, the outer-loop parameters that were determined by a first base station can be transferred to a second base station if the remote station leaves the service of the first base station and enters the serving range of the second base station. Moreover, when the remote station initially enters the serving range of the first base station, i.e., the remote station is powered on, or travels from outside the communication system, the margin parameters can be initialized to some values much lower than the typical values.

The above embodiments describe an outer-loop design that can be used by a scheduling element in a base station to schedule transmissions on a packet data channel and a control channel. The outer-loop design is stable and robust, guarantees a certain grade of service, allows for a fast convergence, and minimizes variations when a steady state is reached.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, an apparatus for transmitting a packet in a transmission format, comprising:
   a receiving subsystem for receiving channel quality information from a remote station;
   a scheduling element for inserting a data payload into a packet for transmission, wherein the scheduling element is configured to use a outer-loop algorithm to determine the feasibility of a transmission format for the packet and to alter the parameters of the outer-loop algorithm in accordance with the channel quality information, and wherein the scheduling element is further configured to determine the parameters from a channel variation rate derived from a fading curve reconstructed from the channel quality information; and
   a transmission subsystem for transmitting the packet to the remote station.

2. The apparatus of claim 1, wherein the channel quality information is Carder-to-Interference (C/I) values.

3. The apparatus of claim 2, wherein the scheduling element is further configured to reconstruct the fading curve using the C/I values.

4. The apparatus of claim 1, wherein the channel quality information is the channel variation rate sent from the remote station.

5. In a wireless communication system, an apparatus for transmitting a packet in a transmission format, comprising:
   a receiving subsystem for receiving channel quality information from a remote station, wherein the channel quality information is Carrier-to-Interference (C/I) values;
   a scheduling element for inserting a data payload into a packet for transmission, wherein the scheduling element is configured to use a outer-loop algorithm to determine the feasibility of a transmission format for the packet and to alter the parameters of the outer-loop algorithm in accordance with the channel quality information, wherein the scheduling element is further configured to reconstruct a fading curve using the C/I values, and wherein the scheduling element is further configured to determine a channel variation rate (CVR) using the fading curve; and a transmission subsystem for transmitting the packet to the remote station.

6. The apparatus of claim 5, wherein the parameters of the outer-loop algorithm are altered in accordance with the CVR.

7. In a wireless communication system, a method for adapting a margin parameter of an outer-loop algorithm used to schedule packet transmissions, comprising:

receiving channel quality information from a remote station;

determining a channel variation rate from the channel quality information;

determining whether to increase or decrease the margin parameter by a margin increment,
wherein the margin increment is based on the channel variation rate and the channel variation rate derived from a fading curve reconstructed from the channel quality information;

comparing the margin parameter to a second margin parameter; and altering the second margin parameter according to a set of selection rules.

8. The method of claim 7, wherein the channel quality information is carrier-to-interference (C/I) values.

9. The method of claim 8, wherein the margin increment is additionally determined by a packet error rate.

10. In a wireless communication system, a method for adapting a margin parameter of an outer-loop algorithm used to schedule packet transmissions, comprising:

receiving channel quality information from a remote station;

determining a channel variation rate from the channel quality information, wherein the channel quality information is carrier-to-interference (C/I) values;

determining whether to increase or decrease the margin parameter by a margin increment, including:
receiving a type of acknowledgment message from the remote station;
if the type of acknowledgment message is an acknowledgment, then decreasing the margin parameter by the margin increment; and
if the type of acknowledgment message is a negative acknowledgment, then increasing the margin parameter by the margin increment;

comparing the margin parameter to a second margin parameter; and altering the second margin parameter according to a set of selection rules.

11. The method of claim 10, wherein margin increment for decreasing the margin parameter is determined by the formula:

$$Step_{decrease} = Step_{increase}/[1/(\text{packet error rate})-1],$$

wherein $Step_{increase}$ is based on a channel variation rate and "packet error rate" is a system parameter.

12. The method of claim 10, wherein the margin increment for decreasing the margin parameter is adaptively sized based on a recent history of increases and decrease to the margin parameter.

13. The method of claim 12, wherein the margin increment for decreasing the margin parameter is adaptively sized based on an exponentially decreasing curve.

14. An apparatus for formatting a packet into a transmission format, comprising:

a memory element; and a processing element configured to execute a set of instructions on the memory element, the set of instructions for:
determining fading curve representative of a transmission channel on which the packet is to be sent to a remote station;
determining a margin offset to the fading curve based on a feedback message from the remote station, the feedback message including one of a channel variation rate determined by the remote station or Carrier-to-Interference (C/I) values; and
determining whether a transmission format incorporating the margin offset is feasible for formatting the packet.

15. The apparatus of claim 14, wherein the processor is further configured to determine a power requirement for the transmission format incorporating the margin offset.

16. The apparatus of claim 15, wherein the processor is further configured to determine the margin offset to the fading curve based on a velocity of the remote station.

17. The apparatus of claim 14, wherein the processor is further configured to determine the margin offset based on whether the margin offset is to be increased or decreased.

18. An apparatus for formatting a packet into a transmission format, comprising:

a memory element; and a processing element configured to execute a set of instructions on the memory element, the set of instructions for:
determining a fading curve representative of a transmission channel on which the packet is to be sent to a remote station;
determining a margin offset to the fading curve based on a feedback message from the remote station:
determining whether a transmission format incorporating the margin offset is feasible for formatting the packet;
determining a power requirement for the transmission format incorporating the margin offset; and
determining the margin offset to the fading curve based on a velocity of the remote station, wherein the velocity is determined using Doppler estimation.

19. An apparatus for formatting a packet into a transmission format, comprising:

a memory element; and a processing element configured to execute a set of instructions on the memory element, the set of instructions for:
determining a fading curve representative of a transmission channel on which the packet is to be sent to a remote station:
determining a margin offset to the fading curve based on a feedback message from the remote station:
determining the margin offset based on whether the margin offset is to be increased or decreased, and
determining a decreasing margin offset according to:

$$Step_{decrease} = Step_{increase}/[1/(\text{packet error rate})-1],$$

wherein $Step_{increase}$ is the increasing margin offset and "packet error rate" is a system parameter; and
determining whether a transmission format incorporating the margin offset is feasible for formatting the packet.

20. A method for formatting a packet into a transmission format, comprising:
- determining a fading curve representative of a transmission channel on which the packet is to be sent to a remote station;
- determining a margin offset to the fading curve based on a feedback message from the remote station, the feedback message including one of a channel variation rate determined by the remote station or Carrier-to-Interference (C/I) values; and
- determining whether a transmission format incorporating the margin offset is feasible for formatting the packet; and
- if feasible, then formatting the packet according the transmission format incorporating the margin offset.

21. The method of claim 20, further comprising determining a power requirement for the transmission format incorporating the margin offset.

22. The method of claim 20, further comprising determining the margin offset to the fading curve based on a velocity of the remote station.

23. The method of claim 22, further comprising determining the margin offset based on whether the margin offset is to be increased or decreased.

24. A method for formatting a packet into a transmission format, comprising:
- determining a fading curve representative of a transmission channel on which the packet is to be sent to a remote station;
- determining a margin offset to the fading curve based on a feedback message from the remote station and based on a velocity of the remote station;
- determining the margin offset based on whether the margin offset is to be increased or decreased, and determining a decreasing margin offset according to:

$$\text{Step}_{decrease} = \text{Step}_{increase}/[1/(\text{packet error rate})-1],$$

wherein $\text{Step}_{increase}$ is the increasing margin offset and "packet error rate" is a system parameter:
- determining whether a transmission format incorporating the margin offset is feasible for formatting the packet; and
- if feasible, then formatting the packet according the transmission format incorporating the margin offset.

25. The method of claim 24, wherein the feedback message is a carrier-to-interference (C/I) values.

* * * * *